United States Patent [19]

Brun

[11] Patent Number: 5,793,522

[45] Date of Patent: Aug. 11, 1998

[54] OBSERVATION WINDOW FOR CHECKING THE TEMPERATURE OF OBJECTS

[75] Inventor: Michel Brun, Bizanos, France

[73] Assignee: Comet, Paris, France

[21] Appl. No.: 602,320

[22] Filed: Feb. 16, 1996

[30] Foreign Application Priority Data

Dec. 29, 1995 [FR] France ............................... 95 15762

[51] Int. Cl.6 .............................. G02B 1/02; G02B 5/00; G02B 7/00; G02B 13/14

[52] U.S. Cl. ..................... 359/350; 359/894; 359/903; 73/334

[58] Field of Search .................... 359/350, 355, 359/356, 894, 600, 903; 73/328, 330, 331, 334

[56] References Cited

U.S. PATENT DOCUMENTS

| | | |
|---|---|---|
| 2,056,672 | 7/1936 | Hogg . |
| 2,638,810 | 5/1953 | Berleme ........................... 359/894 |
| 3,744,873 | 7/1973 | Jamison ........................... 359/894 |
| 3,896,463 | 7/1975 | Laskey ............................ 359/903 |
| 3,922,999 | 12/1975 | Meginnis ......................... 359/894 |
| 3,942,881 | 3/1976 | Meginnis ......................... 359/894 |
| 3,951,301 | 4/1976 | Meginnis ......................... 359/894 |
| 3,957,359 | 5/1976 | Meginnis ......................... 359/894 |
| 4,162,390 | 7/1979 | Kelly ............................ 219/121.63 |
| 4,244,280 | 1/1981 | Stoll ............................. 92/159 |
| 4,291,988 | 9/1981 | Dixon, Jr. et al. .............. 356/437 |
| 4,301,341 | 11/1981 | Parry . |
| 4,372,652 | 2/1983 | Pontefract ....................... 359/894 |
| 4,409,815 | 10/1983 | Burkel et al. .................. 75/35.07 |
| 4,436,375 | 3/1984 | Meginnis ......................... 359/894 |
| 4,494,525 | 1/1985 | Albertsen ........................ 126/289 |
| 4,738,064 | 4/1988 | Aarts et al. ..................... 359/894 |
| 4,985,805 | 1/1991 | Riedel et al. .................... 361/704 |
| 4,986,636 | 1/1991 | Contzen et al. .................. 359/894 |
| 5,062,706 | 11/1991 | Magnussen, Jr. et al. ........ 359/894 |
| 5,210,658 | 5/1993 | Foster ........................... 359/894 |
| 5,244,369 | 9/1993 | Miller . |
| 5,440,143 | 8/1995 | Carangelo . |

Primary Examiner—Jon W. Henry
Attorney, Agent, or Firm—Roland Plottel

[57] ABSTRACT

Observation window, especially for checking the temperature of objects using infrared thermography, including a parallel-faced transparent insert made of a single crystal suitable for radiation to pass through without being substantially modified and/or attenuated, which radiation, whose wavelength may range from the visible to the relatively far infrared emanates from an object whose temperature is to be monitored, housed in a screened cabinet provided with a door or panel against which the window is arranged, wherein the insert is fitted into a support which surrounds it at its periphery and is immobilized with respect to the support, this support being applied in a sealed manner against an aperture made in the door and then locked in position by means which are only accessible from inside the cabinet, the support comprising an external protective cover capable of pivoting about a pin connecting it to this support, so as to reveal the insert and allow observation through it of the object to be monitored by an infrared camera.

14 Claims, 2 Drawing Sheets

OBSERVATION WINDOW FOR CHECKING THE TEMPERATURE OF OBJECTS

The present invention relates to an observation window making it possible to monitor and check the correct operation of electrical apparatuses of the type comprising circuit breakers, transformers and enclosures containing one or more of these, terminals of high-power electric motors, banks of capacitors, or other apparatuses, which are placed inside a screened cell and subjected to very high electrical voltages such that, in particular, direct access to these apparatuses, which require opening this cell, is in principle forbidden, except in the case when these apparatuses are switched off beforehand by cutting off their power supply.

However, in many electrical power installations or distribution networks, where similar screened cabinets are commonly used, it may be particularly detrimental to cut off the supply current in order to make a satisfactory check of the behaviour of these apparatuses, especially in order to verify the state of their terminals or of the connection links which may constitute the weak points in their connections.

In particular, it is absolutely essential to be able to monitor and check frequently, or even permanently, the temperature reached at these sensitive points inside the screened cabinet and more generally the region surrounding these points, in particular without interrupting the current, in such a way that the Joule effect created by the current flowing through the equipment in question is not modified, so that the temperature behaviour of the apparatuses in question and of their connections is known continuously.

Conventional methods for measuring temperatures under such conditions, in particular without direct contact with the points or regions to be checked, usually consist in carrying out infrared thermography by means of a camera which receives the radiation emitted by the apparatus to be monitored after its objective has been focused narrowly on the targeted point.

It is known that, according to Wien's law, any heated material or body, as its temperature rises, emits radiation covering a wide wavelength band, with an energy peak corresponding to monochromatic radiation whose wavelength in microns is such that, to a first approximation, the product of this wavelength and the temperature expressed in degrees absolute (Kelvin) is equal to a constant (C=2898), which means that the hotter the body the more it radiates at short wavelengths.

Under the usual conditions encountered with the type of installations envisaged, and for the range of temperatures likely to be encountered, the radiation emitted has a wavelength which as a general rule lies approximately between 3 and 12 microns, that is to say lying within the more or less far infrared, this range being divided up in that it is conventional to refer to band 2 for wavelengths ranging from approximately 2 to 5.5 microns and band 3 for wavelengths ranging from 6 to 12 microns.

However, it should be emphasized that the temperature check to be made must in fact be able to cover a wider spectrum, ranging from the visible to the broadened infrared, without any break, the aforementioned wavelength values being therefore indicative only.

Now, in order to allow transmission of the radiation emitted from inside the screened cabinet to the camera forming part of an infrared thermography installation, it is convenient for the beam to be able to pass through the locked door which closes the cabinet, without undergoing substantial attenuation and, above all, without transformation of its wavelength.

The invention relates to an observation window which meets this objective, allowing faithful transmission of the infrared radiation emitted by the apparatus that is to be monitored and checked inside the screened cabinet towards the camera located outside the latter, which, under these conditions, records a signal to be analysed which exactly represents the temperature reached, this window moreover having a pass band allowing an observer to see the monitored apparatus directly.

By virtue of being fitted into the door in a sealed manner, the window in question prevents dust or other foreign bodies from getting inside the cabinet. In addition, it is designed to have a high impact strength. Lastly, it is fitted in such a way that it is impossible to remove it from outside the door, but only from inside, once the latter has been unlocked under satisfactory safety conditions, especially after cutting off the electrical power supply.

In order to meet these requirements, the window according to the invention, including a parallel-faced transparent insert made of a single crystal suitable for radiation to pass through without being substantially modified and/or attenuated, which radiation, whose wavelength may range from the visible to the relatively far infrared, emanates from an object whose temperature is to be monitored, housed in a screened cabinet provided with a door or panel against which the window is arranged, is characterized in that the insert is fitted into a support which surrounds it at its periphery and is immobilized with respect to the support, this support being applied in a sealed manner against an aperture made in the door and then locked in position by means which are only accessible from inside the cabinet, the support comprising an external protective cover capable of pivoting about a pin connecting it to this support, so as to reveal the insert and allow observation through it of the object to be monitored by an infrared camera.

Preferably, the parallel-faced transparent insert consists of a single crystal whose pass band ranges from the visible to the infrared and which is made of calcium fluoride for infrared radiation lying within band 2 (approximately 3 to 6 microns) and of barium fluoride for infrared radiation in band 2 and also band 3 (approximately 7 to 12 microns).

In a preferred embodiment, the support consists of a flat metal piece, in the form of a cylindrical ring, having a central opening, arranged in front of the aperture in the door, and an open rabbet surrounding this opening and designed to accommodate the transparent insert, this insert being fastened to the edge of the rabbet by a bead of adhesive extending around its periphery.

Preferably, the transparent insert is fitted with a slight clearance with respect to the bottom of the rabbet, connection to the support being achieved by the peripheral bead of adhesive only around that edge of the rabbet which is perpendicular to this bottom.

In an alternative embodiment, the transparent insert is fitted into a central opening made in a metal supporting plate and having the same external profile, and is fastened to the plate around the perimeter of this opening by means of a bead of adhesive, the supporting plate itself then being adhesively bonded to the support in the open rabbet of the latter.

Advantageously, the bead of adhesive fastening the transparent insert to the support or to the supporting plate, as well as the latter to the support, consists of a polymerizable mastic, especially of the polyurethane type, capable of withstanding an appreciable temperature rise through the window.

Also according to another characteristic, the support includes a plane face for bearing on the door or panel of the screened cabinet, comprising a circular groove for fitting an O-ring seal held captive between the support and the door or panel.

Advantageously, the O-ring seal used is a seal made of butadiene acrylonitrile, especially such as that marketed under the name "Perbunan", or made of any other similar synthetic material.

According to yet another characteristic, the protective cover has the same external profile and the same cylindrical ring shape as the support and is pivoted to the latter about a perpendicular rotation pin so as to be able to slide by rotation over the support, which is immobilized to the door or panel, in order to reveal the transparent insert.

The cover is itself transparent to radiation in the visible range and is preferably produced from polycarbonate, so as to have a high impact strength. Also preferably, the rotation pin consists of a screw with a shouldered head, which is mounted in a counterbore in the cover and engages in a tapped hole in the support, the depth of the counterbore being such that the screw does not project beyond the visible contour of the cover.

Finally, and in a preferred embodiment, the cover includes a pill of a magnetized magnetic material, this pill being crimped into a housing made in the cover and being designed to act cooperatively with a pad, also made of magnetic material, fitted into the support, the pill and pad facing each other when the cover exactly covers the support, in such a way that the magnetized pill immobilizes the cover in this position.

Other characteristics of an observation window for checking temperature using infrared thermography, the window being produced in accordance with the invention, will again emerge from the following description of certain embodiments, given by way of indication and implying no limitation, with reference to the appended drawings in which.

Figure 1:
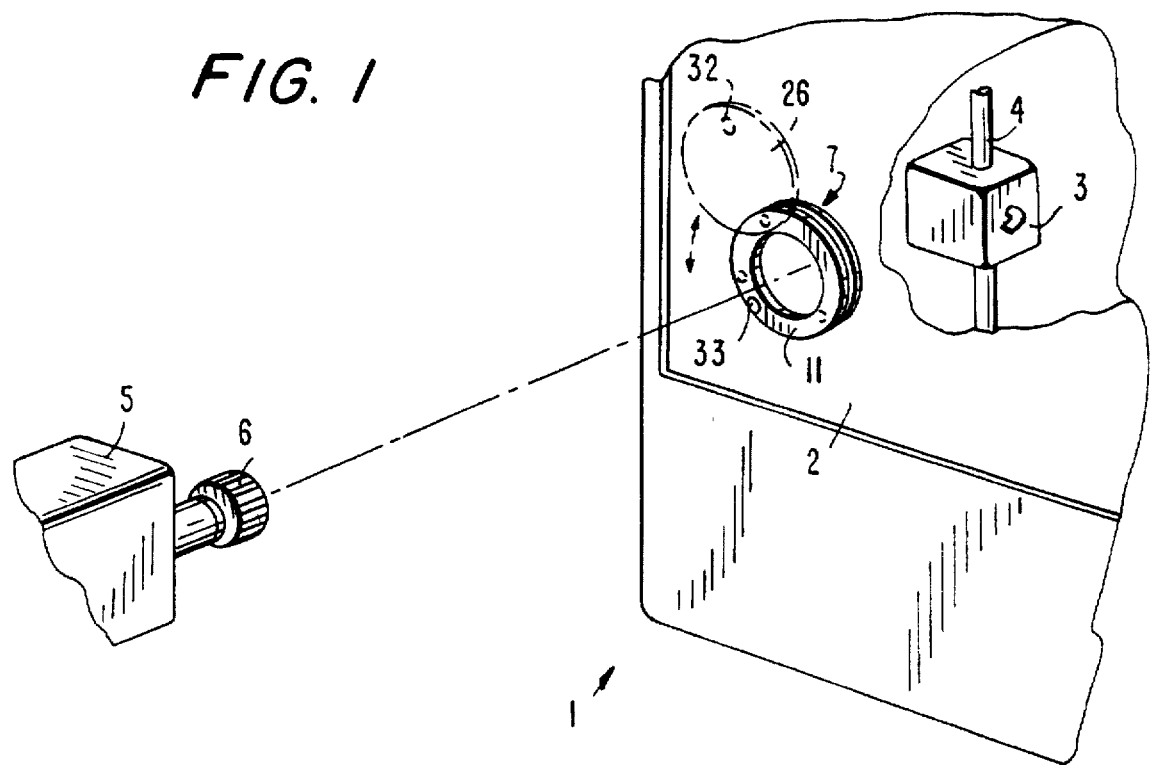
FIG. 1 is a partial perspective view which diagrammatically represents a screened cabinet inside which has been shown an electrical apparatus assumed to be under voltage, the temperature of which it is desired to check by means of an infrared thermography camera whose line of sight passes through a window in accordance with the invention.

In FIG. 1, the reference 1 diagrammatically denotes a screened cabinet which includes a panel or door 2 for access to the inside of this cabinet in which objects of any kind, and more specifically electrical apparatuses, are arranged, like the one depicted under the reference 3, these being powered in particular at very high voltages, of the type comprising circuit breakers, transformers or the like, these apparatuses including connection links, such as 4, at their terminals the door or panel 2 is shown with a portion cut out to illustrate the electrical apparatus 3 and the connecting link 4 inside the cabinet 1.

In operation, these apparatuses are subjected to appreciable temperatures, in particular at these terminals, which consequently have to be monitored and checked frequently in order to avoid these temperatures exceeding an acceptable maximum threshold.

Given the considerable voltages involved, it is not as a general rule possible to gain direct access to the apparatuses 3 in the cabinet 1, it normally being possible to unlock the door or panel 2 of the latter only after cutting off the electrical power supply.

The technique of monitoring and checking the temperature therefore consists in using an infrared thermography camera 5 whose objective 6 is directed towards the desired apparatus through an observation window 7 fitted into the door 2 of the cabinet 1, this window having specific characteristics in accordance with the present invention.

Figure 2:
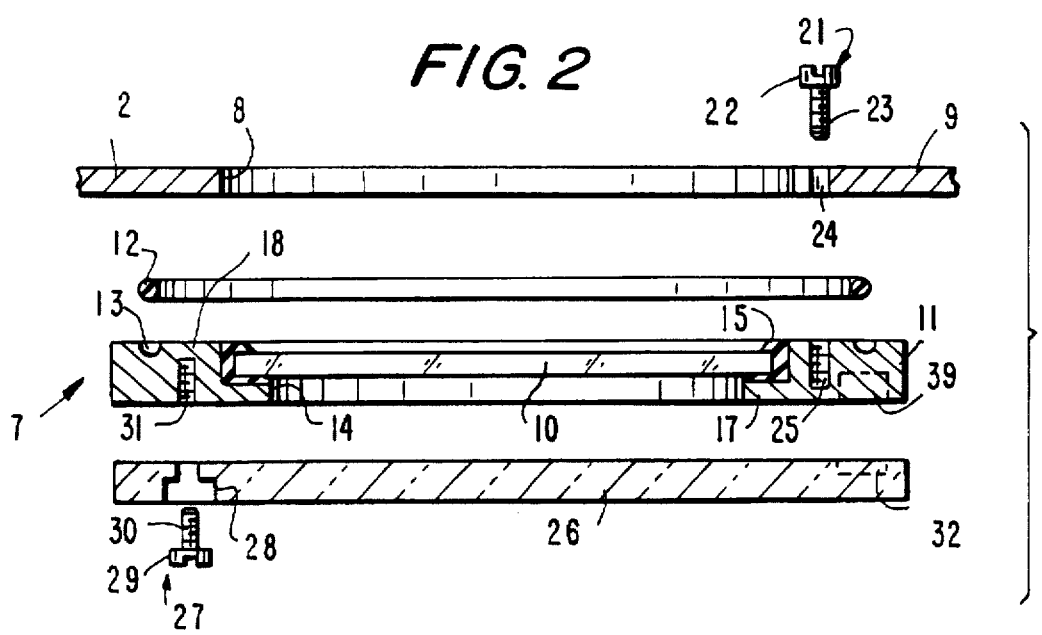
FIG. 2 is a sectional elevation view of the various constituent parts of the window in FIG. 1, these being shown in an exploded manner.

FIG. 2 shows the door or panel 2 of the cabinet again, in which is made an aperture 8, generally of circular profile, and against which panel the window 7 is intended to be placed, against the outer face 9 of the panel 2, on the outside of the screened cabinet.

The window 7 is mainly composed of a transparent insert 10 made of a single-crystal material, the characteristics of which will be defined hereinbelow, and of a metal support 11 into which the insert 10 is fitted and in which the latter is immobilized, before this support is applied against and fixed to the face 9 of the panel 2, with interposition of an O-ring seal 12 fitted into a groove 13 in the support.

Figure 3:
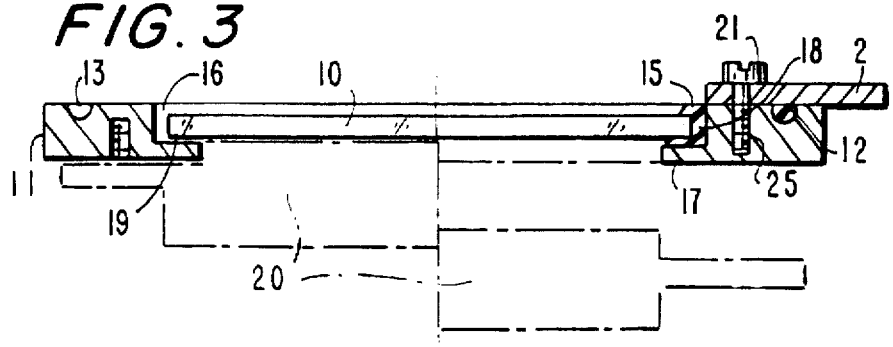
FIG. 3 is a sectional view making it possible to explain the way in which the transparent insert is fitted into the support of the window and immobilized therein.

In the preferred example of an embodiment, illustrated in FIGS. 2 and 3, the support 11 is in the form of a flat cylindrical ring which includes a central opening 14 intended to be arranged in front of the aperture 8 in the panel 2, with the transparent insert 10 interposed between them.

This insert, with carefully machined and polished parallel faces, is preferably produced, depending on the case and in particular on whether the thermography camera 5 is designed to work in band 2 or in band 3—which depends on the range of temperatures to be checked —from a single crystal obtained by using a conventional sequence of melting and solidifying a pure product, especially calcium fluoride or barium fluoride, in an oven with a temperature gradient, well known per se in the prior art.

In the case of a calcium fluoride single crystal having a thickness of less than or equal to 10 mm, the pass band goes from the visible to the infrared, the transmission coefficient of the incident radiation remaining at about 90% for wavelengths lying between 0.2 and 8 microns, while for a barium fluoride single crystal, the range may be extended, with a transmission coefficient of about the same magnitude, as far as approximately 10 microns.

The insert 10 is immobilized in the support 11 by means of a bead of adhesive 15 which preferably consists of an adhesive mastic of the polyurethane or similar type.

As illustrated more particularly in FIG. 3, the support includes an open rabbet 16 delimited by a bottom 17 and a lateral edge 18 which extends perpendicular to this bottom. The insert 10 is placed inside the rabbet and is preferably not applied against the bottom 17 but, on the contrary, leaves between it and the bottom a slight clearance 19 of the order of one or two tenths of a millimeter, by using a fitting jig 20 which engages its central part in the opening 14, and sits level in the rabbet with the corresponding clearance.

With the insert 10 being pressed against the jig 20 inside the rabbet 16, the bead of adhesive 15 is put into place by any appropriate means, being distributed mainly between the periphery of the insert and the lateral edge 18 of the rabbet, and also filling the clearance 19 between the external face of the insert and the bottom 17, rendering the assembly perfectly sealed with respect to the outside.

The window thus formed is then applied against the face 9 of the panel 2 and immobilized in position by a set of screws 21, these preferably being three in number and distributed at 120° in the support, these screws having a head 22 for abutment behind the panel and a threaded body 23 which passes through a drillhole 24 in the panel in order to engage in a blind hole 25, suitably tapped, made in the support 11 outside the rabbet 16.

These arrangements allow in particular the support to be completely immobilized on the door or panel 2, while leaving the fixing screws 21 entirely invisible from the outside of the screened cabinet 1, in such a way that the window cannot be removed when the panel is locked, with its electrical apparatuses 3 live.

The window device is completed by means of an external protective cover 26 having the same profile as the support 11, that is to say in the form of a cylindrical plate, this cover preferably being transparent and advantageously made from polycarbonate in order to give it excellent impact resistance.

The cover 26 is fastened to the support 11 by means of a screw 27 forming a pivot pin, this screw being fitted into a counterbore 28 in the cover shaped so that the head 29 of the screw does not project outwards from the cover, its threaded part 30 being engaged in a tapped housing 31 in the support.

Finally, the cover 26 may usefully include a pill 32 of a magnetized magnetic material, crimped into the material of the cover, which lies facing a pad 33, also made of magnetic material which is itself fitted into the support 11, in such a way that, because of the magnetic attraction between the pill 32 and the pad 33, the cover is able to be normally immobilized at the front and against the support, protecting the transparent insert 10, it being possible for this cover to be easily pivoted about the pin formed by the screw 27, thereby separating the pad and the pill, when it is necessary to make a measurement by means of the camera 5, as shown in FIG. 1.

Advantageously, the pill 32 is produced with the aid of a material having a high coercive field, especially a neodymium-based alloy and especially an iron-neodymium-boron alloy.

It should be noted that the pill 32 forming the magnet, fitted into the cover 26, plays an additional role, allowing this cover to be held in a raised position, so as to reveal the insert 10, during the measurements made through the latter, the magnetic field created being completed via the material of the door 2 of the screened cabinet, or more generally of the support to which the window is fixed, in such a way that this cover does not fall back down into its closure position due to the effect of its own weight and so inopportunely intercepts the beam of the infrared camera 5.

Figure 4:
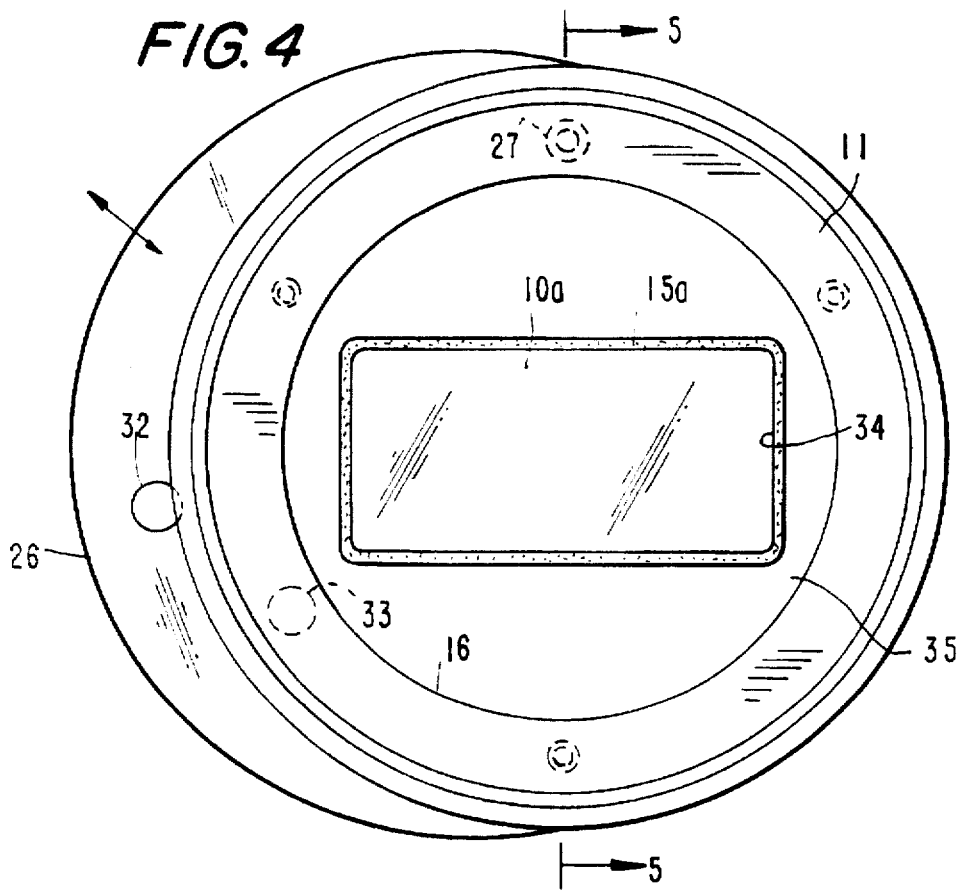
FIG. 4 illustrates, in an outside front view, an alternative embodiment of the window in question.
Figure 5:
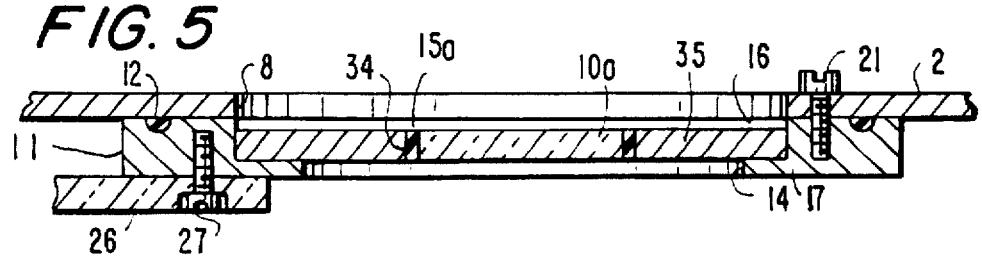
FIG. 5 is a cross-sectional view of the window illustrated in FIG. 4.

FIGS. 4 and 5 illustrate another alternative embodiment which essentially differs from the previous one by the shape of the transparent insert and the way it is fitted into the window support.

In these figures, the same reference numbers have been used again to denote the same members which, consequently, have not been described again.

In this second version, the transparent insert 10a has a rectangular shape and not a circular one as in the previous example. Furthermore, this insert 10a is housed in an opening 34, also rectangular and of the same size, made in a metal supporting plate 35, having the same thickness as the insert 10a, the latter being connected to this supporting plate by means of a bead of adhesive 15a of the same kind as that already provided in the first embodiment.

The combination consisting of the insert 10a and the supporting plate 35 is next placed in the rabbet 16 of the support 11 and bears on the bottom 17 of the rabbet, against which bottom it in turn is adhesively bonded by a mastic or other similar product, preferably one analogous to that which provides the connection to the insert.

An observation window is thus produced which is of simple design but which has many advantages.

Maintenance of the window is easy, in particular, in the event of damage or after prolonged use, possibly obscuring the surface of the insert made of single crystal material, in order rapidly to replace this insert.

The adhesive bonding of the insert to its support enables perfect sealing to be achieved, while at the same time allowing the dimensional variations which are created by the temperatures existing on either side of the window through the screened cabinet's panel into which it is fitted. Moreover, this adhesive bonding allows good damping of shocks to the insert, should there by an impact on the front face of the protective cover.

For its part, the latter provides three protective functions, mechanical protection from external shocks, sealing protection from dust and liquids which may possibly environ the window on the outside of the cabinet, while keeping the outer face of the insert always clean, and lastly protection from possible thermal shocks.

The window satisfies in every point the requirements of the NF C 20010 standard relating to windows and optical devices for checking electrical equipment with regard to the mandatory sealing and the absence of electrical conductivity. In addition, the chosen way of fitting the window prevents it from being able to be dismantled and removed from the outside, which furthers the security it provides.

Finally, the use of perfectly pure single crystals allows transmission over a broad radiation range, easily covering the entire temperature range likely to be encountered in installations of the type more especially envisaged.

Of course, it goes without saying that the invention is not limited to the examples of embodiments more especially described hereinabove with reference to the appended drawings; on the contrary, it encompasses all the alternative forms thereof. In particular, no limitation has been envisaged with regard to the useful size of the single-crystal inserts and to the external diameter of the support receiving these inserts. Preferably, this diameter may vary from 70 to 95 mm, depending on the case, although these measurements are not of any limiting character, the useful area of the window depending on the scanning necessary for the infrared camera and on the number of contacts to be monitored inside the screened cabinet.

I claim:

1. Observation window, for checking the temperature of objects using infrared thermography, including a parallel-faced transparent insert made of a single crystal suitable for radiation to pass through without being substantially changed which radiation, whose wavelength may range from the visible to the relatively far infrared emanates from an object whose temperature is to be monitored, housed in a screened cabinet provided with a door or panel against which the window is arranged, wherein the insert is fitted into a support which surrounds it at its periphery and is immobilized with respect to the support, this support being applied in a sealed manner against an aperture made in the door and then locked in position by means which are only accessible from inside the cabinet, the support comprising an external protective cover capable of pivoting about a pin connecting it to this support, so as to reveal the insert and allow observation through it of the object to be monitored by an infrared camera.

2. Observation window according to claim 1 wherein the parallel face transparent insert single crystal has a pass band which ranges from the visible to the infrared and which is made of calcium fluoride or of barium fluoride.

3. Observation window according to claim 1, wherein the support comprises a flat metal piece, in the form of a cylindrical ring, having a central opening, arranged in front of the aperture in the door, and an open rabbet surrounding this opening and designed to accommodate the transparent insert, this insert being fastened to the edge of the rabbet by a bead of adhesive extending around its periphery.

4. Observation window according to claim 3, wherein the transparent insert is fitted with a slight clearance with respect to the bottom of the rabbet, connection to the support being achieved by the peripheral bead of adhesive only around that edge of the rabbet which is perpendicular to this bottom.

5. Observation window according to claim 3, wherein the transparent insert is fitted into a central opening made in a metal supporting plate and having the same external profile, and is fastened to the plate around the perimeter of this opening by means of a bead of adhesive, the supporting plate itself then being adhesively bonded to the support in the open rabbet of the support.

6. Observation window according to claim 3, wherein the bead of adhesive fastening the transparent insert to the support or to a supporting plate, as well as the latter to the support, consists of a polymerizable mastic, especially of the polyurethane type.

7. Observation window according to claim 1, wherein the support includes a plane face for bearing on the door or panel of the screened cabinet, comprising a circular groove for fitting an O-ring seal held captive between the support and the door or panel.

8. Observation window according to claim 7, wherein the O-ring seal used is a seal made of butadienne acrylonitrile, especially such as that marketed under the name "Perbunan", or made of any other similar acronitrolite type synthetic material.

9. Observation window according to claim 3, wherein the protective cover has the same external profile and the same cylindrical ring shape as the support and is pivoted to the latter about a perpendicular rotation pin so as to be able to slide by rotation over the support, which is immobilized to the door or panel, in order to reveal the transparent insert.

10. Observation window according to claim 9, wherein the cover is transparent to radiation lying within the visible range and is produced from polycarbonate.

11. Observation window according to claim 10, wherein the rotation pin consists of a screw with a shouldered head, which is mounted in a counterbore in the cover and engages in a tapped hole in the support, the depth of the counterbore being such that the screw does not project beyond the visible contour of the cover.

12. Observation window according to claim 9, wherein the cover includes a pill of a magnetized magnetic material, this pill being crimped into a housing made in the cover and being designed to act cooperatively with a pad, also made of magnetic material, fitted into the support, the pill and pad facing each other when the cover exactly covers the support, in such a way that the magnetized pill immobilizes the cover in this position.

13. Observation window according to claim 4, wherein the bead of adhesive fastening the transparent insert to the support or to a supporting plate, as well as the latter to the support, consists of a polymerizable mastic, especially of the polyurethane type.

14. Observation window according to claim 5, wherein the bead of adhesive fastening the transparent insert to the support or to the supporting plate, as well as the latter to the support, consists of a polymerizable mastic.

* * * * *